US008589491B2

(12) United States Patent
Morin et al.

(10) Patent No.: US 8,589,491 B2
(45) Date of Patent: Nov. 19, 2013

(54) AUTOMATED AGING OF CONTACTS AND CLASSIFYING RELATIONSHIPS

(75) Inventors: David B. Morin, San Francisco, CA (US); Shawn D. Fanning, San Francisco, CA (US); Dustin R. Mierau, San Francisco, CA (US); Daniel S. Dofter, San Francisco, CA (US); Matthew M. Matteson, San Francisco, CA (US); Mark Lewandowski, San Francisco, CA (US); Mary Ann Brennan, San Francisco, CA (US); Daniel Trinh, San Francisco, CA (US); Mallory Paine, San Jose, CA (US)

(73) Assignee: Path, Inc., San Francisco, CA (US)

(*) Notice: Subject to any disclaimer, the term of this patent is extended or adjusted under 35 U.S.C. 154(b) by 47 days.

(21) Appl. No.: 13/178,376

(22) Filed: Jul. 7, 2011

(65) Prior Publication Data
US 2012/0011204 A1 Jan. 12, 2012

Related U.S. Application Data

(60) Provisional application No. 61/363,081, filed on Jul. 9, 2010, provisional application No. 61/494,388, filed on Jun. 7, 2011.

(51) Int. Cl.
*G06F 15/16* (2006.01)
(52) U.S. Cl.
USPC .......................................... 709/205; 709/207
(58) Field of Classification Search
USPC .................................................. 709/205, 207
See application file for complete search history.

(56) References Cited

U.S. PATENT DOCUMENTS

| 7,359,894 | B1* | 4/2008 | Liebman et al. ...................... 1/1 |
| 7,373,109 | B2* | 5/2008 | Pohja et al. ................... 455/41.2 |
| 7,509,131 | B2* | 3/2009 | Krumm et al. ............. 455/456.1 |
| 7,620,404 | B2* | 11/2009 | Chesnais et al. ........... 455/456.1 |
| 2005/0159970 | A1 | 7/2005 | Buyukkokten et al. |
| 2009/0112701 | A1 | 4/2009 | Turpin et al. |
| 2009/0164574 | A1 | 6/2009 | Hoffman |
| 2009/0228296 | A1 | 9/2009 | Ismalon |
| 2010/0070448 | A1 | 3/2010 | Omoigui |
| 2010/0161369 | A1 | 6/2010 | Farrell et al. |

OTHER PUBLICATIONS

PCT International Search Report and Written Opinion, PCT Application No. PCT/US11/43252, Nov. 16, 2011, 12 pages.

* cited by examiner

*Primary Examiner* — Kristie Shingles
(74) *Attorney, Agent, or Firm* — Fenwick & West LLP

(57) ABSTRACT

One or more interactions between a first user and a second user of a social networking system are identified. Each respective interaction of the one or more interactions is scored based on a group score and a time penalty. The group score is based on the number of users in the respective interaction and the time penalty is based on a time between a current time and a time of a last interaction between the first user and the second user. A relationship ranking that measures the first user's affinity towards the second user is determined, where the relationship ranking comprises one or more interaction scores. An indicator representing the relationship ranking is sent to a client for display.

14 Claims, 9 Drawing Sheets

AUTOMATED AGING OF CONTACTS AND CLASSIFYING RELATIONSHIPS

CROSS-REFERENCE TO RELATED APPLICATIONS

This application claims the benefit of priority to U.S. Provisional Application Ser. No. 61/363,081 filed Jul. 9, 2010, which application is incorporated by reference herein in its entirety. This application also claims the benefit of priority to U.S. Provisional Application Ser. No. 61/494,388 filed Jun. 7, 2011, which application is incorporated by reference herein in its entirety.

FIELD OF ART

The present description relates to managing and classifying relationships in a social networking system.

BACKGROUND

In order to increase user engagement, existing social networking systems encourage users to connect with as many people as possible. As a result, users typically have many connections they do not interact with on the social network. Also, the connections a user interacts with tends to change over time. In order to maintain a set of significant connections, a user may have to remove or disassociated from some connections. Existing methods require that a user manually remove a connection which is inconvenient, time consuming and in some cases socially unacceptable.

Some existing social networks allow a user to specify lists or groups of connections that are important to the user. However, many users do not take advantage of this feature because it is complicated and time consuming.

SUMMARY

According to one embodiment, a system and method are provided to classify a relationship in a social networking system. One or more interactions between a first user and a second user of a social networking system are identified. Each respective interaction of the one or more interactions is scored based on a group score and a time penalty. The group score is based on the number of users in the respective interaction. The time penalty is based on a time between a current time and a time of a last interaction between the first user and the second user. A relationship ranking that measures the first user's affinity towards the second user is determined, where the relationship ranking comprises one or more interaction scores. An indicator representing the relationship ranking is sent to a client for display.

According to one embodiment, a system and method are provided to age contacts in a social networking system. An expiration parameter is assigned to a contact of a user. The expiration parameter indicates when the contact should be disassociated from the user. An interaction between the user and the contact is detected. The expiration parameter is modified for the contact based on the detected interactions.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. ("FIG.") 1 is a block diagram illustrating a distributed client-server system in accordance with some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
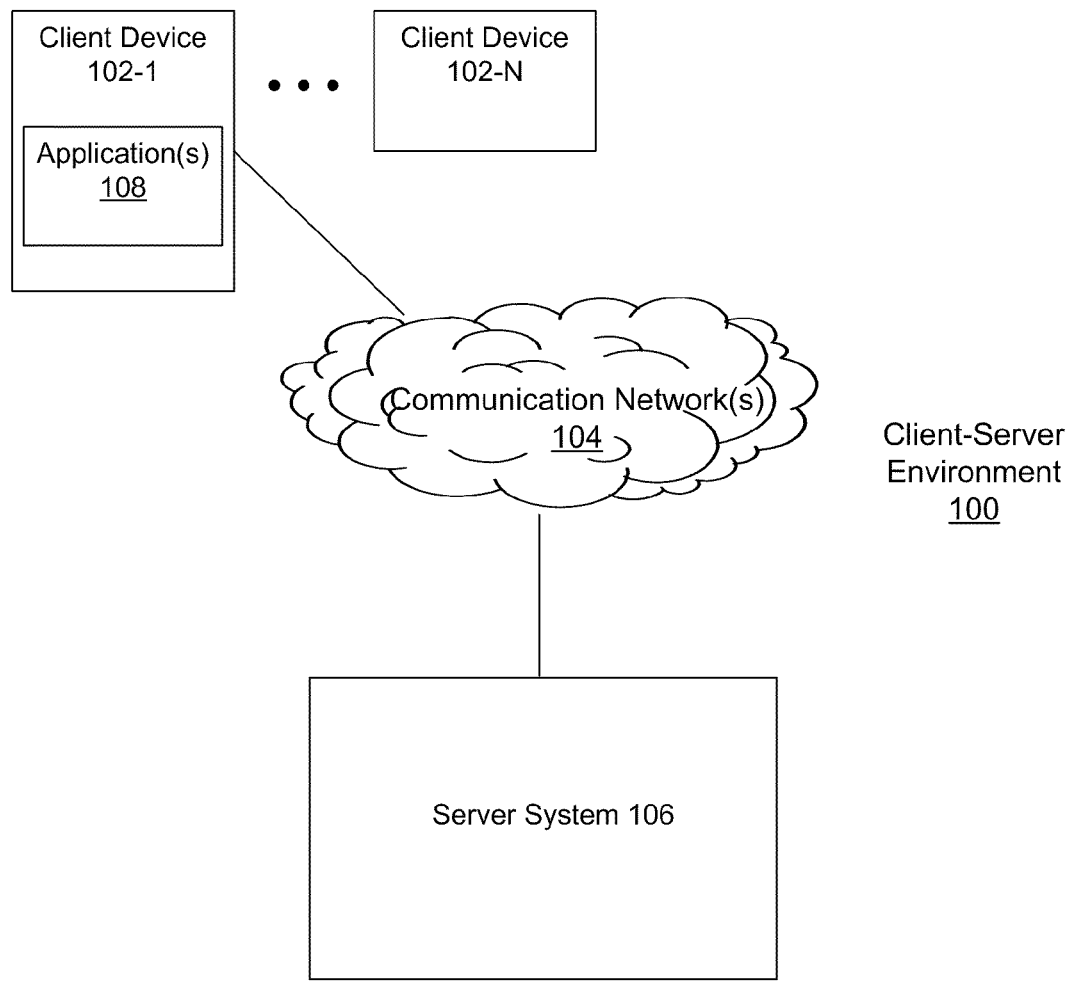

FIG. 1 is a block diagram illustrating a distributed system 100 that includes one or more clients 102, a communication network 104 and a server system 106. The one or more clients 102 and communicatively coupled with the server system 106 through the communication network 104.

In some embodiments server system 106 is implemented as a single server, while in other embodiments it is implemented as a distributed system of multiple servers. Solely for convenience of explanation, server system 106 is described below as being implemented on a single server system.

The communication network(s) 104 can be any wired or wireless local area network (LAN) and/or wide area network (WAN), such as an intranet, an extranet, or the Internet. It is sufficient that the communication network 104 provides communication capability between the client devices 102 and server system 106. In some embodiments, the communication network 104 uses the HyperText Transport Protocol (HTTP) and the Transmission Control Protocol/Internet Protocol (TCP/IP) to transmit information between devices or systems. HTTP permits client devices 102 to access various resources available via the communication network 104. The various embodiments disclosed, however, are not limited to the use of any particular protocol.

In some embodiments, a user interfaces with server system 106 at a client device 102. A client device 102 may be any suitable computer device that is capable of connecting to server system 106 via communication network 104, such as a computer, desktop computer, laptop computer, tablet device, internet kiosk, personal digital assistant, mobile phone, gaming device, or any other device that is capable of communicating with server system 106. The client device 102 may communicate with the server system 106 via an application 108 such as a web browser or native application.

Figure 2:
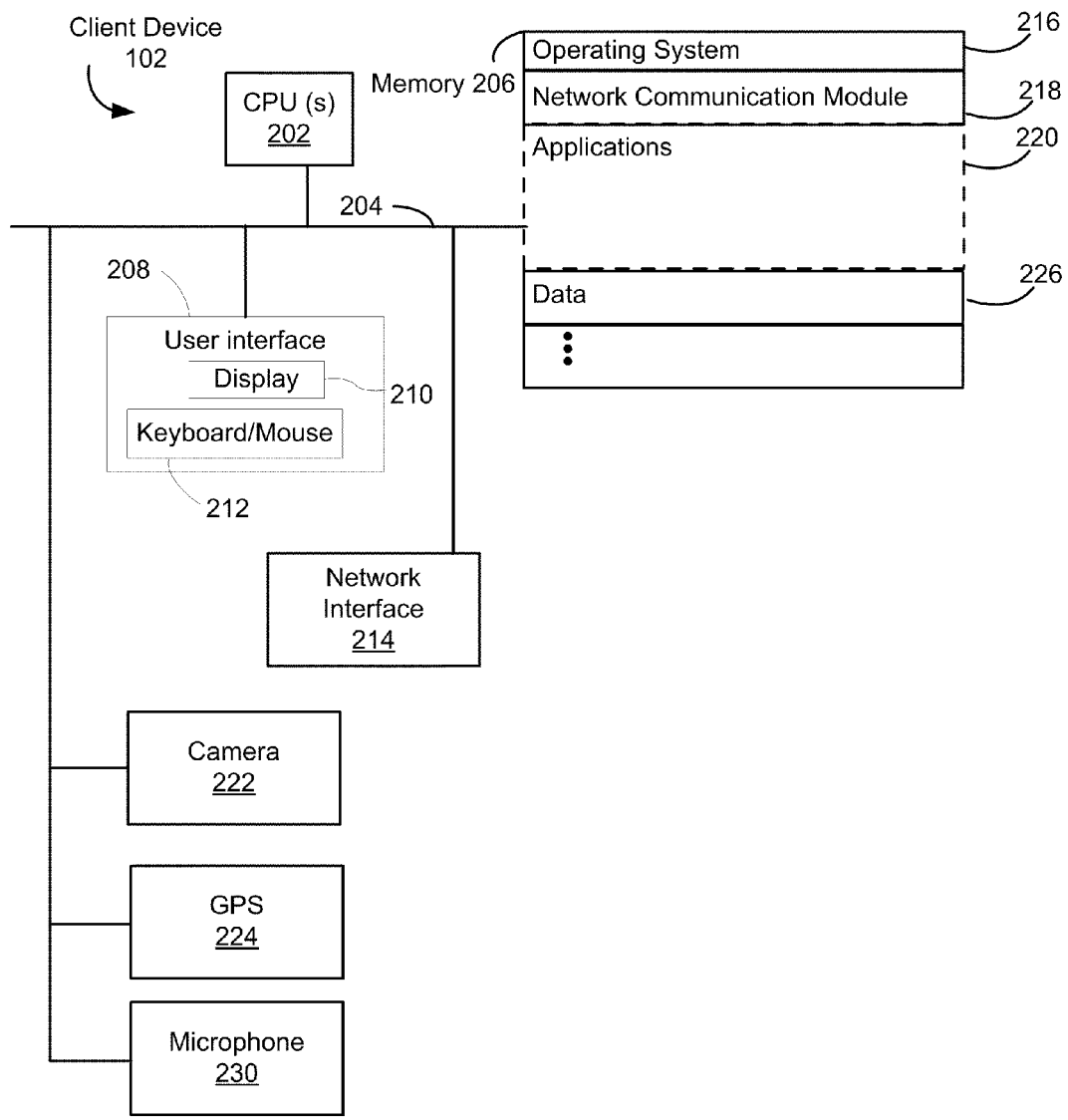
FIG. 2 is a block diagram of a client device according to some embodiments.

FIG. 2 is a block diagram illustrating one example embodiment of the client device 102. The client device 102 includes one or more processing units (CPU's) 202, one or more network or other communications interfaces 214, a memory 206, a user interface 208, a camera 222, a GPS 224 and one or more communication buses 204 for interconnecting these components. The communication buses 204 optionally include circuitry (sometimes called a chipset) that interconnects and controls communications between system components. The client device 102 typically includes a user interface, comprising for example a display device 210 and optionally a keyboard and/or mouse (or other pointing device) 212. In some embodiments, the display device 210 is a touch screen display. The camera 222 captures images and video to be stored as data 226. The GPS 224 determines the location of the client device 102. A microphone 230 captures audio content.

The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within memory 206, comprises a non-transitory computer readable storage medium.

In some embodiments, the memory 206 comprises a computer readable storage medium. The memory 206 can be configured to store an operating system 216, a network communication module 218 (embodied as instructions executable by the CPU 202), applications 220 (embodied as instructions executable by the CPU 202) and data 226.

The operating system 216 includes procedures for handling various basic system services and for performing hardware dependent tasks. The network communication module 218 is used for connecting client device 102 to server system 106 and/or other devices and computers via the one or more communication network interfaces 214 (wired or wireless) and one or more communication networks, such as the Internet, other wide area networks, local area networks, metropolitan area networks, and so on. The applications 220 include applications to capture content such as pictures, video and audio. The applications 220 allow a user to send the captured content to the server system 106 for storage as well as receive content from the server system 106. In some embodiments, the data 226 stores captured content and content metadata. The content metadata includes descriptions of content, tags of users and geographic location information.

Figure 3:
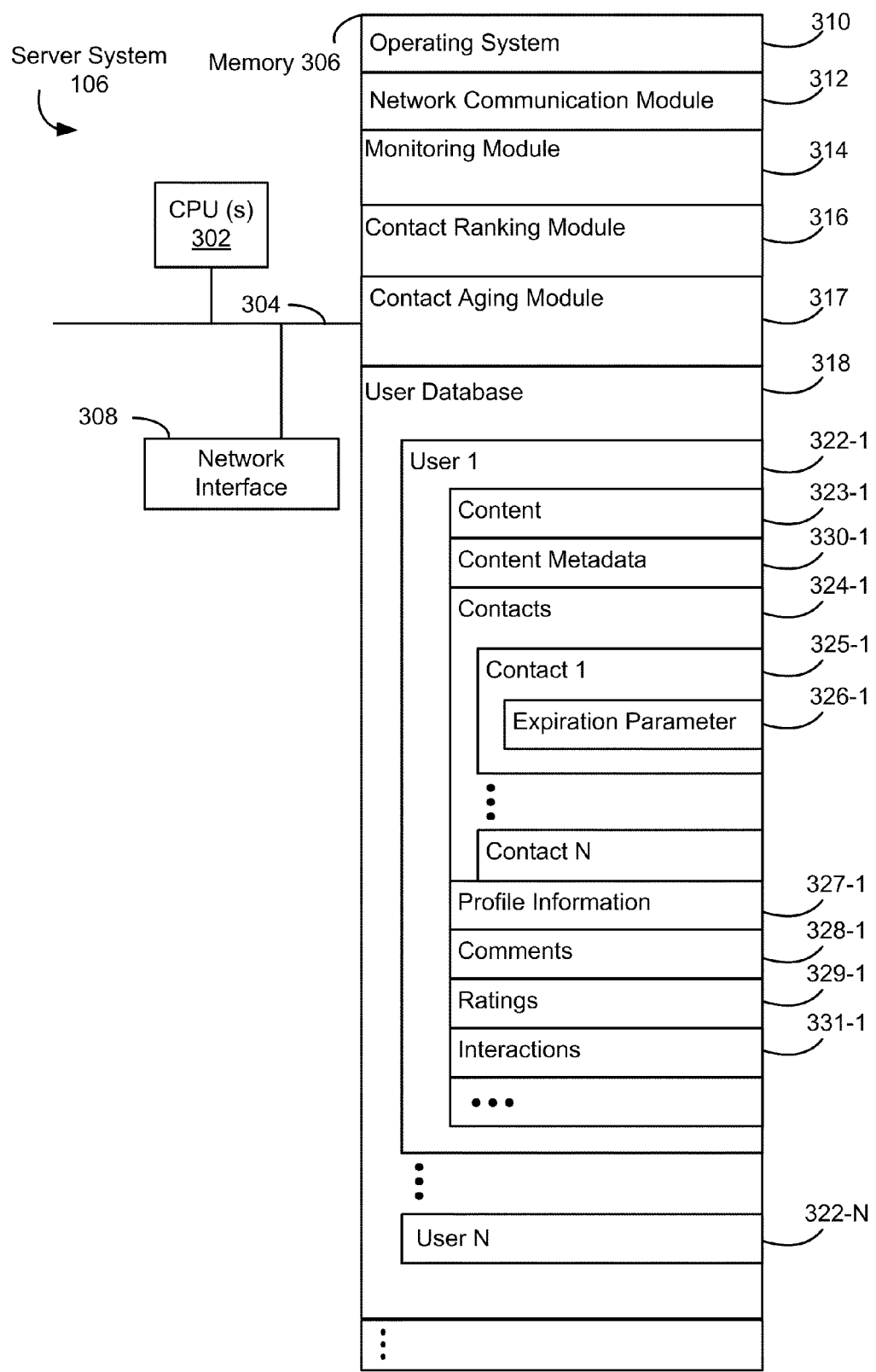
FIG. 3 is a block diagram of a server system according to some embodiments.

FIG. 3 is a block diagram illustrating one example embodiment of the server system 106. Server system 106 includes one or more processing units (CPU's) 302, one or more network or other communications interfaces 308, a memory 306, and one or more communication buses 304 for interconnecting these components. The communication buses 304 optionally include circuitry (sometimes called a chipset) that interconnects and controls communications between system components. The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 optionally includes one or more storage devices remotely located from the CPU(s) 302. The memory 306, or alternatively the non-volatile memory device(s) within the memory 306, comprises a non-transitory computer readable storage medium. In some embodiments, the memory 306 or the computer readable storage medium of memory 306 store the following programs, modules and data structures, or a subset thereof:

- an operating system 310 that includes procedures for handling various basic system services and for performing hardware dependent tasks;
- a network communication module 312 that is used for connecting server system 106 to client devices 102 and/or other devices and computers via the one or more communication network interfaces 308 (wired or wireless) and one or more communication networks, such as the Internet, other wide area networks, local area networks, metropolitan area networks, and so on;
- a monitoring module 314, discussed below;
- a contact ranking module 316, discussed below;
- a contact aging module 317, discussed below; and
- a user database 318, which stores information for one or more users, as discussed in greater detail herein.

The user database 318 stores information for one or more users 322. In some embodiments, user database 318 is a distributed database. Information for a respective user 322-1 includes content 323, contacts 324, profile information 327, comments 328 and ratings 329, content metadata 330 and interactions 331. User profile information 327 stores information such as biographic, demographic and other types of descriptive information (work experience, educational history, hobbies or preferences, interests, location, and the like).

Comments 328 stored in the user database 218 include comments by the user as well as comments from other users on content associated with the user. Ratings 329 include the user's rating of content. Interactions 331 stores information about the user's interactions which includes a time of the interaction, the identifiers of other users involved in the interaction, the type of the interaction and weights associated with the interaction. The content 323 includes images, video, audio associated with the user. The content may be captured by the user or another user. The content metadata 330 includes descriptions or categories of content, tags of users and geographic location information. For example, the user may apply a category of "places" to a picture depicting a landmark.

The user database 318 also is configured to store a list of contacts 325 associated with a user and an expiration parameter 326 for each contact. In some embodiments, the expiration parameter 326 for a contact specifies a length of time or a time and date when a respective contact should expire. Once the expiration parameter expires, the contact is disassociated from the user. Stated in another way, the contact and the user will no longer be connected after the expiration of the expiration parameter. As a result, the contact will not be able to view the user's private information.

The monitoring module 314 monitors actions of users and stores information about the actions in the user database 318. The actions include capturing and storing content. For example, a user may capture an image, a video or audio. The actions include interactions between users such as messaging, tagging, commenting and rating. In some embodiments, the monitoring module 314 applies weights to the actions. The monitoring module 314 identifies one or more interactions between users and sends information about the interactions to the contact ranking module 316 and the contact aging module 317.

The contact aging module 317 ages and removes contacts associated with a user. The contact aging module 317 assigns an initial expiration parameter to each contact of a user. In some embodiments, the expiration parameter comprises an expiration value and a decay factor which determines the rate of decay of the expiration value. For example, the expiration value may be a numerical value (e.g., 1) and the rate of decay may decay the expiration value by 0.01 every day. In some embodiments, the expiration parameter indicates when the contact should be disassociated from the user. For example, the expiration parameter may indicate a specific time or a period of time.

In some embodiments, the expiration parameter is specified by the user. For example, the user may specify an expiration value and a decay factor for the expiration value or the user may specify that a particular contact expires after a amount of time or on a specific day and time. In some embodiments, the initial expiration parameter is based on one or more factors including the frequency of interactions between the user and the contact, an importance value assigned to the contact by the user, and common profile information associated with the user and the contact.

In some embodiments, each of the factors discussed above is assigned a weight or value. The frequency of interactions between the contact and the user may map to different values. For example, if a user and a contact interact once a month then the expiration parameter for the contact will expire some time after a month. Importance values may map to expiration parameters or modify an expiration parameter. For example, a contact with a high importance value could have an expiration parameter that lasts longer than a contact with a low importance value. The total number of common profile information or each set of common profile information may be weighted. For example, if two users have a common geographic location and common education background, weights may be given to each set of information or the total number of commonalities (e.g., two) could be used in determining the expiration parameter. The expiration parameter may be based on multiple factors. In some embodiments, the expiration parameter is a sum or product of the weighted factors.

The contact aging module 317 modifies the expiration parameter for a contact based on an interaction between the contact and the user. In some embodiments, the expiration parameter is modified to extend the time until the expiration parameter expires. In some embodiments, when the expiration parameter comprises a expiration value and a decay factor, the expiration value and/or the decay factor are modified.

In some embodiments, an interaction score is determined for the interaction and used to modify the expiration parameter of the contact. The modification increases the time before the expiration parameter expires or slows the decay of the expiration value. The interaction score comprises one or more contribution scores derived from aspects of the interaction. In some embodiments, the interaction score is based on one or more aspects of an interaction including the type of the interaction, a time of the interaction, the number of users in the interaction or the total number of interactions between the user and the contact and an importance parameter associated with the contact. Each aspect of the interaction may be weighted or given a contribution score. For example, an interaction score may be based on a weight assigned to the type of the interaction, a time of the interaction, the number of users in the interaction and the total number of interactions between the contact and the user. In some embodiments, the expiration parameter for the contact is modified based at least in part on a user assigned importance parameter associated with the contact.

In some embodiments, the expiration parameter for the contact is modified based on a user specified criteria and user specified aging factor. The user may specify how the expiration parameter for certain groups of users is modified. For example, the user may specify that all users in a certain country have a predefined amount of time increased to their expiration parameter when the user interactions with them.

The contact aging module 317 monitors for expiration of expiration parameters. Once a contact has expired, the contact aging module 317 modifies the relationship between the contact and the user. In some embodiments, the user is disassociated from the contact. In some embodiments, the contact is transitioned to a lower status where the contact is still connected to the user but can see only a subset of the user's private information. For example, the user may define several levels of access such as high, medium and low, where each level of access can view a different amount of the user's private information.

The contact ranking module 316 performs a relationship ranking (e.g., generally referenced as RelationshipRank or FriendRank) process (e.g., embodied as instructions executable by a CPU and referenced as an algorithm) to help classify the relationship between two particular users. When applied to all of a user's contacts, the RelationshipRank process helps identify the user's current most relevant contacts. RelationshipRank calculates the value of a relationship by observing the behavior between two individuals and their social surroundings at the time of the observation. The contact ranking module 316 determines a relationship ranking or relationship score between a user and a contact based on one or more interactions between the contact and the user and the corresponding timestamps. When determining the relationship ranking, the contact ranking module 316 takes several components into account, including but not limited to: the size of the group at the time the unique pair of users were observed together and the time between now and the last time the pair of users were observed together.

The contact ranking module 316 examines the recent history of all the interactions in which a pair of users (u1; u2) have both been mentioned. Recent history is defined as all interactions or events within the previous T days. This set of events is known as $W_{(u_1,u_2),T}$. The contact ranking module 316 sums each of the influences of the events between two users in order to determine the relationship ranking between the two users. The influence of each event comprises two components. The first component is a fixed value based on the size of the group observed. This portion is a group score (e.g., generally referenced as GroupScore). In some embodiments, the GroupScore component assigns a fixed value between 0 and 1 to an event, where the event is rated as the most valuable (with a GroupScore of 1) if the there are N users in the event, and decaying to 0 as the group becomes larger. Equation 1 illustrates the GroupScore for an event, according to some embodiments. Equation 1:

$$GroupScore(w) = \begin{cases} 1/e^{(n-2)/c_1} & \text{if } n \geq N \\ 0 & \text{if } n < N \end{cases} \quad (1)$$

In equation 1, n is the size of the group in the event's observation, and $c_1$ is a tuning constant.

The second component determines how influential a single event is based an element of recency. The RelationshipRank applies a time penalty (e.g., generally referenced as TimePenalty) to events. In particular, the RelationshipRank algorithm weights more recent events higher, and decays the influence that older events based on an exponential model described in equation 2:

$$TimePenalty(w) = \begin{cases} e^{(t-T)/c_2} & \text{if } t \leq T \\ 1 & \text{if } t > T \end{cases} \quad (2)$$

In equation 2, t represents the current time as some number of time units since the observation was registered. T is the maximum age an observation can be before the time penalty reaches 1 and $c_2$ is a tuning constant.

The total influence of any single event is influence(w)= GroupScore*(1−TimePenalty). The contact rank module 316 calculates a summation of all of the influences of all of the recent events. Equation 4 represents this summation, according to some embodiments.

$$RelationshipRank_{(u_1,u_2)} = \left( \frac{\sum_{i=0}^{|W_{(u_1,u_2),T}|} Influence(w_i)}{c_3} \right)^{1/2} \quad (4)$$

In some embodiments, the relationship ranking for a contact is represented as a numerical value. In some embodiments, the relationship ranking for a contact is represented as a graphical indicator. In some embodiments, the contact ranking module 316 prepares a list of contacts and a list of relationship ranking corresponding to the list of contacts.

Ranking Contacts

Figure 4:
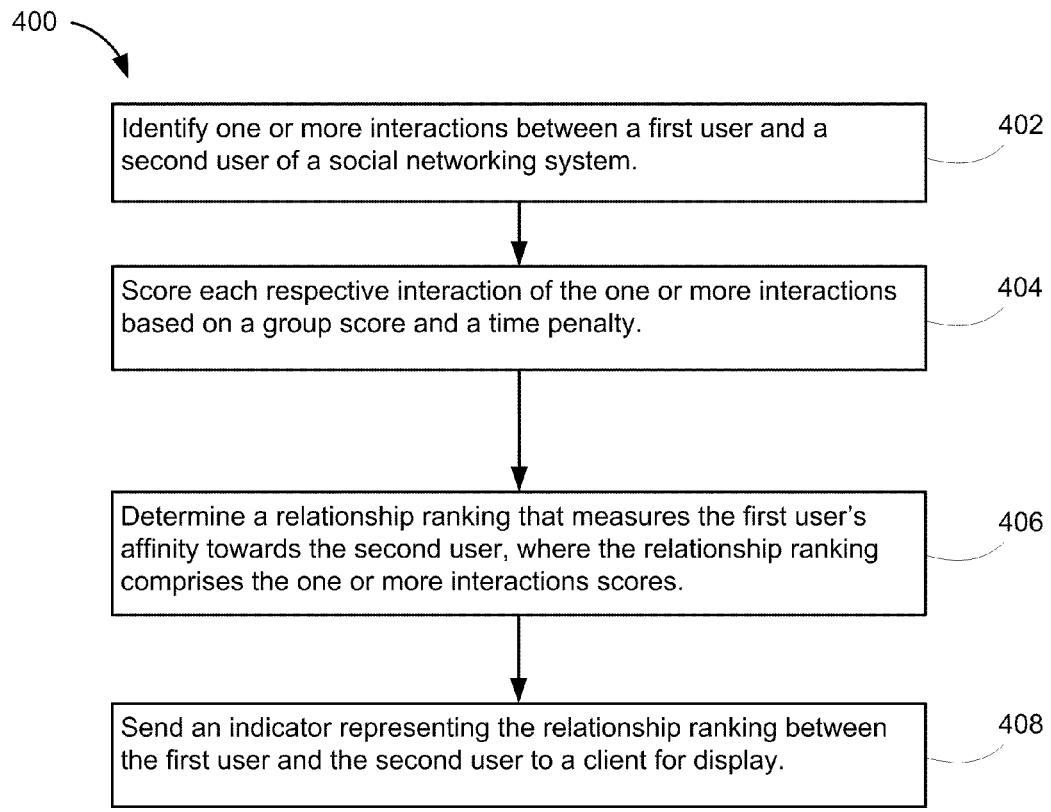
FIG. 4 is a flowchart illustrating a process of classifying a friendship according to some embodiments.
Figure 5A:
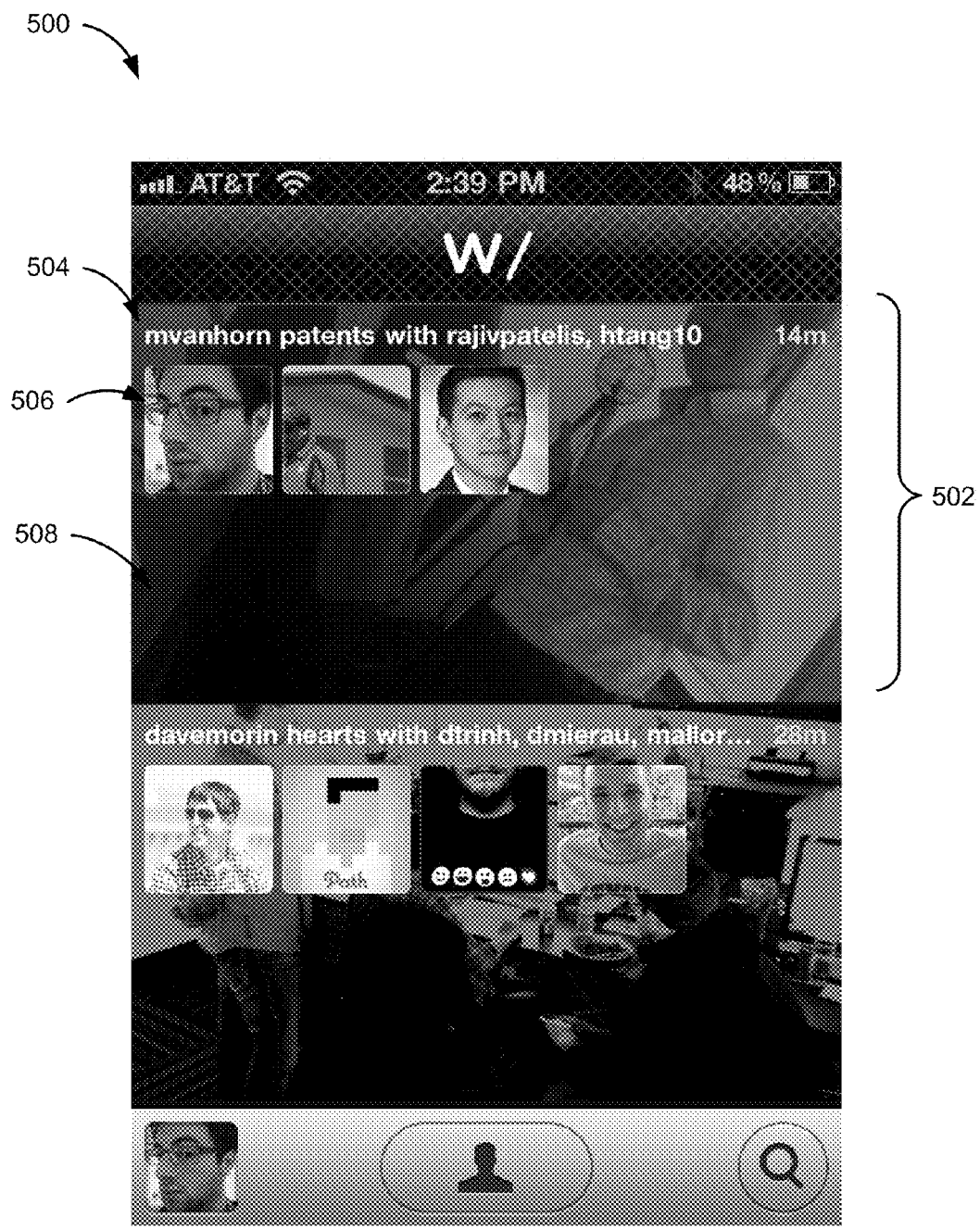
FIG. 5A and FIG. 5B are exemplary screenshots according to some embodiments.

FIG. 4 is a flow diagram illustrating an example method 400 of classifying a relationship between two users, according to some embodiments. The method 400 is performed at a server system 106 with one or more processors (or CPUs 302) and memory 306. The monitoring module 314 identifies one or more interactions between a first user and a second user of a social network system (402). In some embodiments, an interaction is any event that involves the first user and the second user. In some embodiments, a respective interaction comprises a message including user identifiers for the first user and the second user. In some embodiments, the user identifiers in the message are links to corresponding user profiles. In some embodiments, the respective interaction indicates that the first user is with the second user. In some embodiments, the respective interaction is associated with one or more images or videos. For example, as shown in FIG. 5A, interaction 502 includes an image 508, a message 504 that includes identifiers (e.g., mvanhorn, rajivpatelis and htang10) for one or more users and graphical identifiers 506 corresponding to the users in the message.

The contact ranking module 116 scores the one or more interactions based on a group score and a time penalty (404). The contact ranking module 116 performs the RelationshipRank algorithm discussed above to determine a relationship rank for the second user. The score of a respective interaction represents the influence of the respective interaction. The group score measures the quality of a respective interaction and is based on the number of users in the respective interaction. The number of people in an interaction indicates the quality of the interaction. For example, interactions involving two users are the most valuable. In some embodiments, the group factor is decayed based on the number of users in a respective interaction. For example, a group of two users may be assigned a highest value of one and each group numbering more than two users is decayed based on the number of users in the interaction. In some embodiments, interactions having a group size larger than a predefined number are given a group score of zero.

The time penalty weights more recent interactions higher and decays the influence of older interactions in order to help identify contacts that are currently most important to the user. In some embodiments, the time penalty is based on a time between a current time and a time of the last interaction between the first user and the second user. The interactions between users who interact more frequently are weighted higher than users who rarely interact.

The contact ranking module 316 determines a relationship ranking that measures an affinity of a first user towards the second user, where the relationship ranking comprises the one or more interaction scores (406). The goal of the relationship ranking is to rate or score a relationship between two users. By taking into account the group score and the time penalty, the friendship ranking identifies contacts of a user that are currently important to the user. As a user's friendships change the set of contacts that are important to the user will also change.

Figure 5B:
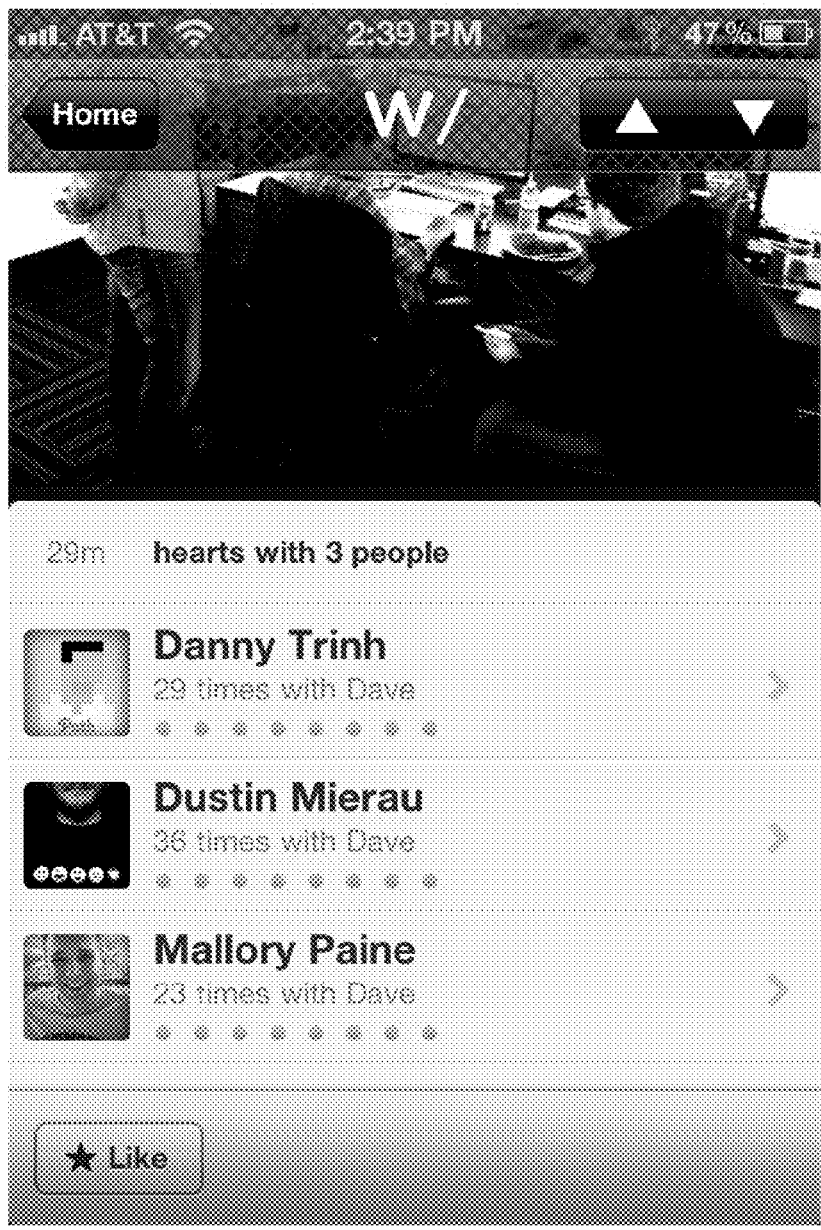

The contact ranking module 316 sends an indicator representing the relationship ranking between the first user and the second user to a client for display (408). For example, the indicator may be a numerical value or graphic representing the relationship ranking. In some embodiments, the contact ranking module 316 sends a list of contacts and a list of corresponding indicators to a user. For example, as shown in FIG. 5B, the user may view a list of user identifiers and corresponding relationship ranks 512.

Contact Acing

Figure 6:
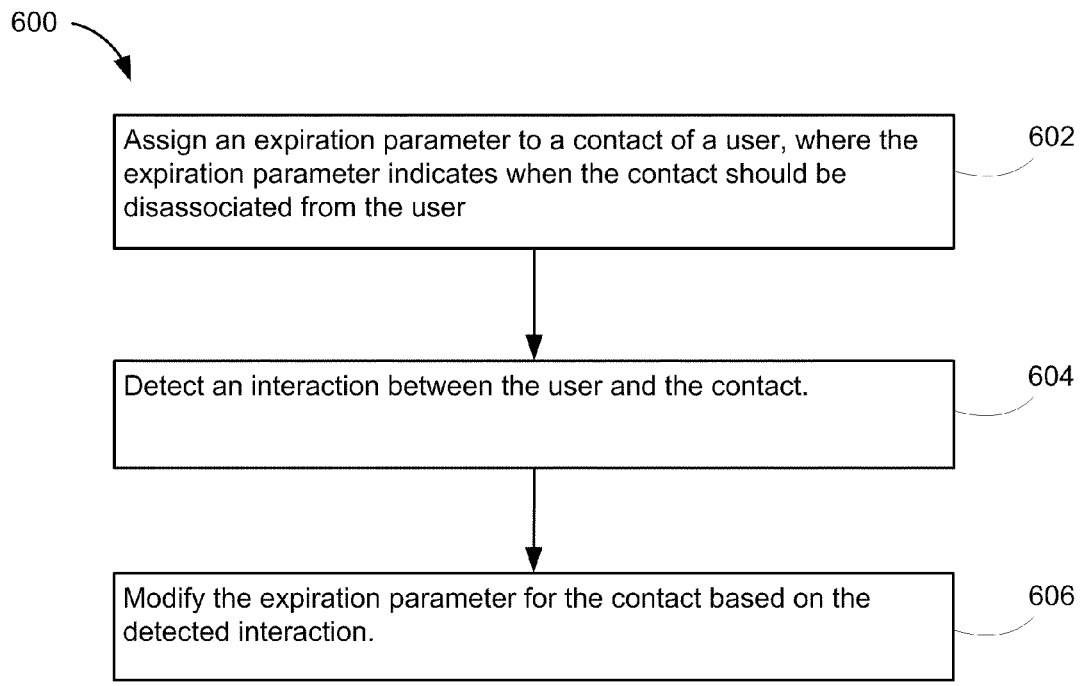
FIG. 6 is a flowchart illustrating the process of aging a contact according to some embodiments.

FIG. 6 is a flow diagram illustrating an example method 600 of aging contacts in a social networking system, according some embodiments. A contact is aged and eventually disassociated with a user unless the user interacts with the contact. Such method allows a user to maintain contacts that the user actually interacts with out requiring that the user actively manage their contacts. In addition, since the user does not manually remove contacts, the removed contacts will not be offended.

Method 600 is performed at a server system 106 with one or more processors (CPU 302) and memory 306. The contact aging module 317 assigns an expiration parameter to a contact of a user (602). In some embodiments, the expiration parameter comprises a expiration value and a decay factor which determines the rate of decay of the expiration value. In some embodiments, the expiration parameter indicates when the contact should be disassociated with the user. For example, the expiration parameter may indicate a specific time or a period of time. Once disassociated, the former contact cannot view the user's private information or content.

In some embodiments, the expiration parameter is specified by the user. For example, the user may specify an expiration value and a decay factor for the expiration value or the user may specify that a particular contact expires in one month or on a specific day and time. In some embodiments, the initial expiration parameter is based on one or more factors including the frequency of interactions between the contact of the user and the contact, on an importance value set by the user for the contact, common profile information associated with the user and the contact or any combination thereof.

The monitoring module 314 detects one or more interactions between the user and the contact (604). In some embodiment, the one or more interactions occur after an initial expiration parameter is assigned to the contact. The interaction may include profile views, messages, tagging, comments and content views. For example, the user may view the profile of the contact, send the contact a message, tag the contact in a message or content such as an image, comment on a discussion that the contact is involved in or view content posted by a contact. In some embodiments, the interaction comprises sharing of digital content between the user and the contact. The interaction may be initiated by either the user or the contact.

The contact aging module 317 modifies the expiration parameter for the contact based on the detected interaction. In some embodiments, the expiration parameter for the contact is modified in response to a detected interaction. The expiration parameter may be modified to extend the time until the expiration parameter expires. In some embodiments, an interaction score is determined for the interaction and used to modify the expiration parameter of the contact. The interaction score comprises one or more contributions derived from aspects of the interaction. The interaction score may be based on the type of the interaction, a time of the interaction, the number of users in the interaction or the total number of interactions between the user and the contact or any combination thereof. Each aspect of an interaction may be given a weight and used as a contribution to the interaction score. For example, an interaction score may be based on a weight assigned to the type of the interaction, a time of the interaction, the number of users in the interaction and the total number of interactions between the contact and the user. The expiration parameter for the contact may be modified based at least in part on a user assigned importance parameter associated with the contact.

In some embodiments, the expiration parameter for the contact is modified based on a user specified criteria and user specified aging factor. The user may specify how the expiration parameter for certain groups of users is modified. For example, the user may specify that all users in a certain country have a predefined amount of time increased to their expiration parameter when the user interactions with them.

In some embodiments, the expiration parameter is determined to have expired and the contact is disassociated from the user. As a result, the contact and the user are not longer connected and the former contact will not be able to view the user's private information. The former contact may still be able to view the user's public information. The former contact and the user may become connections again if one of the user's requests a reconnection.

In some embodiments, when the expiration parameter has expired, the relationship between the contact and the user is transitioned from a full friendship to an intermediate one where the contact can view a subset of the user's content. A user may have three or more types of content such as public content, private content and a subset of the private content.

Connection Graphs

Figure 7A:
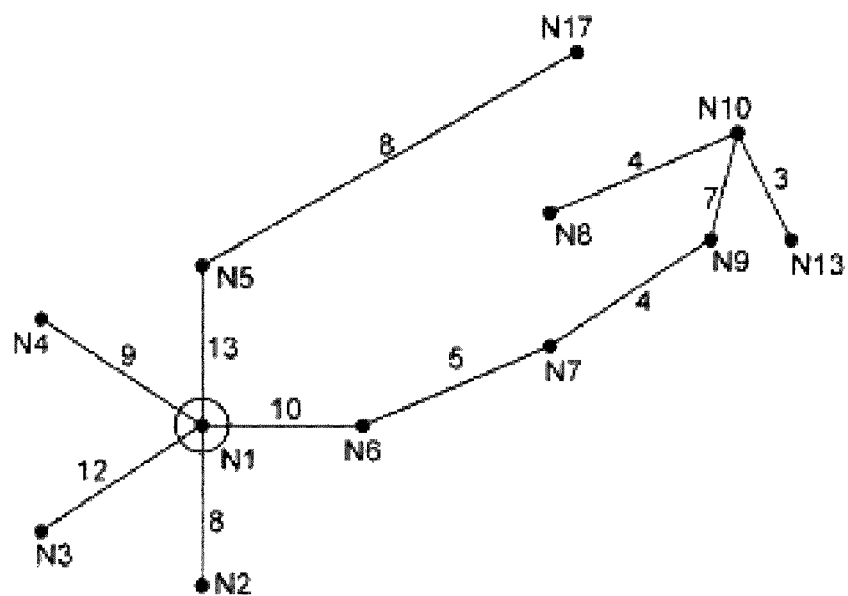
FIG. 7A and FIG. 7B is a set of illustrations showing graphs of contacts (nodes) and connections (edges) for a social contact according to an example embodiment.

FIG. 7A shows an example of a connection graph 700 displayed to a user at a client device according to one embodiment. The graph 700 helps a user visualize their connections. The user may be able to pre-apply filters so that only certain of their connections are shown on the graph 700. For example, filters may be applied to show other users associated with a wine tasting interest, or with sports, or other users who are located within a certain geographical area or distance from the inquiring user's home or current location. Such filters may be based on any of the parameters or other information available via the social networking system. Different colors, graphical objects, symbols, or other indicia of connection type or interest may be used instead of or in addition to the filtering or selection.

In FIG. 7A, the nodes N1, N2 ... N17 represent users of the social networking system and the lines or edges between the nodes indicate connections between the users. In the context of FIG. 7A, user N1 is viewing their own connection graph. The numerical values displayed along the lines indicate the number of interactions between the nodes. In this example, member N1 has had 10 interactions with member N6 and 13 interactions with member N5 over the period of time for which the graph shows data.

In some embodiments, a user may view interactions over a duration of time or interactions on an actual date. In some embodiments, the graph 700 permits the user to either upgrade, downgrade, delete, retain, or otherwise modify the value or relevancy of the connection with that other user in accordance with the automatic aging feature described elsewhere herein.

In some embodiments, the connection graph 700 may only show connections that are about to be dropped so that the user has an opportunity to prevent certain contacts from being disassociated from the user. In some embodiments, the graph 700 includes an interface to add or delete contacts.

Figure 7B:
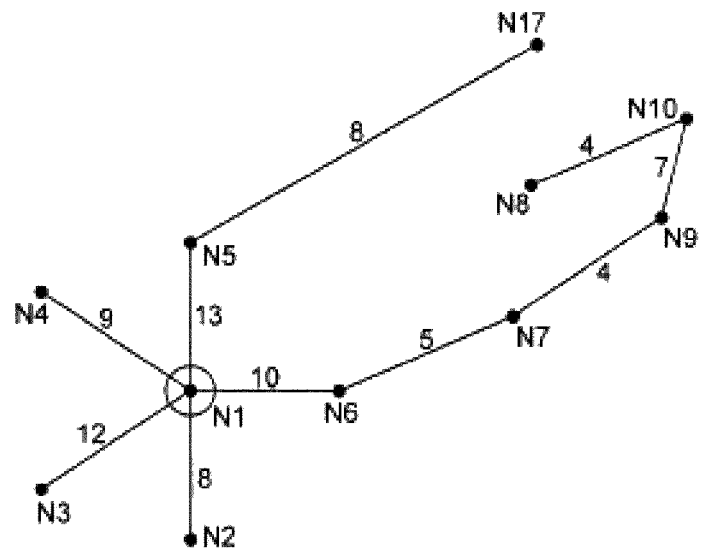

In FIG. 7B, the user is presented with the graph of a selected set of contacts independent of the number of recent interactions. FIG. 7B illustrates the graph that may be displayed to member N1 when the member filters the graph to show only those other members for which there have been three or more interactions over the chosen period of time.

It may be noted that at least some of the information that may be graphically displayed will be displayed in a list or tabular form, such as in Table 1, so that the user may choose between different data display types and may even switch between two or more display types, including applying filters or other selection parameters.

TABLE 1

Shawn's Path Connections

| Connection Filter | Name or ID | First Path Crossing | Last Contact (No. Contacts) | Value/ Age Factor (1 to 10) |
|---|---|---|---|---|
| Electric Cars | Joe W. | May 2010 | May 2010 (3) | Low/2 Cal, Exp. dd/mm/yy |
| Electric Cars | Susan K. | April 2010 | May 2010 (5) | Medium/5 Cal, Exp. dd/mm/yy |
| Electric Cars | Michael A. | April 2010 | April 2010 (1) | Low/2 Cal, Exp. dd/mm/yy |
| Electric Cars | John Y. | February 2010 | February 2010 (8) | High/7 Cal, Exp. dd/mm/yy |
| Electric Cars | Alex M. | January 2010 | April 2010 (5) | Low/4 Cal, Exp. dd/mm/yy |
| Electric Cars | | November 2009 | November 2009 (1) | Low/1 Cal, Exp. dd/mm/yy |

TABLE 1-continued

Shawn's Path Connections

| Connection Filter | Name or ID | First Path Crossing | Last Contact (No. Contacts) | Value/ Age Factor (1 to 10) |
|---|---|---|---|---|
| Electric Cars | | March 2009 | April 2009 (2) | Low/1 Cal, Exp. dd/mm/yy |
| Electric Cars | Dave M. | September 2008 | March 2010 (20) | High/9 Cal, Exp. dd/mm/yy |
| Electric Cars | Rachael W. | August 2008 | September 2009 (3) | Med/5 Cal, Exp. dd/mm/yy |
| Electric Cars | Donald G. | January 2007 | February 2010 (6) | High/8 Cal, Exp. dd/mm/yy |

Note:
dd/mm/yy refers to day/month/year and may differ for each entry

In another non-limiting example, the user may generate and view a list of people or friends that have been identified with various hierarchical levels of importance. The list includes people that the user cares about. In an alternate non-limiting example, the user may be able to query for different groups by geographic location, identified interest, age, gender, marital status, length of relationship, or other personal or demographic information either identified by the user or selected from a predetermined list of relationship groups.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as noted in FIG. 2 and FIG. 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client system 102 or server computer system 106) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, as described with respect to FIGS. 4-7. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for aging contacts and classifying relationships. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method comprising:
   identifying one or more interactions between a first user and a second user within a social networking system;
   scoring each respective interaction of the one or more interactions based on a group score and a time penalty, the group score based on a number of users in the respective interaction and the time penalty is based on a time between a current time and a time of a last interaction between the first user and the second user;
   determining a relationship ranking that measures an affinity of the first user towards the second user, the relationship ranking comprising the one or more interaction scores;
   assigning an expiration parameter to the second user, wherein the expiration parameter indicates when the second user should be disassociated from the first user, the assignment of the expiration parameter being based on a frequency of interaction between the first user and the second user;
   modifying the expiration parameter for the second user based on the identified one or more interactions between the first user and second user; and
   sending to a client for display an indicator representing the relationship ranking between the first user and the second user.

2. The method of claim 1, wherein the respective interaction comprises a message including user identifiers for the first user and the second user.

3. The method of claim 2, wherein the respective interaction indicates that the first user is with the second user.

4. The method of claim 2, wherein the respective interaction includes one or more images or videos.

5. A server system, comprising:
   one or more processors; and
   memory storing one or more programs for execution by the one or more processors, the one or more programs including instructions that when executed cause the one or more processors to:
   identify one or more interactions between a first user and a second user of a social networking system;
   score each respective interaction of the one or more interactions based on a group score and a time penalty, the group score being based on a number of users in the respective interaction and the time penalty being based on a time between a current time and a time of a last interaction between the first user and the second user;
   determine a relationship ranking that measures the first user's affinity towards the second user, the relationship ranking comprising the one or more interaction scores; and
   assign an expiration parameter to the second user, wherein the expiration parameter indicates when the second user should be disassociated from the first user, the assignment of the expiration parameter being based on a frequency of interaction between the first user and the second user;
   modify the expiration parameter for the second user based on the identified one or more interactions between the first user and second user; and
   send to a client for display an indicator representing the relationship ranking between the first user and the second user.

6. A computer implemented method of aging and removing a contact in a social networking system, the method comprising:
   assigning an expiration parameter to a contact of a user, wherein the expiration parameter indicates when the contact should be disassociated from the user, the assignment of the expiration parameter being based on a frequency of interaction between the user and the contact;
   detecting an interaction between the user and the contact; and
   modifying the expiration parameter for the contact based on the detected interaction.

7. The method of claim 6, further comprising determining that the expiration parameter has expired and disassociating the contact from the user.

8. The method of claim 7, further comprising receiving a request from the contact for private content about the user and denying the request.

9. The method of claim 6, wherein the modifying includes extending a time until the expiration parameter expires.

10. The method of claim 6, further comprising:
    determining an interaction score for the interaction based on at least one of a type of the interaction, a time of the interaction and a number of users in the interaction; and
    wherein the expiration parameter is modified based on the interaction score.

11. The method of claim 6, wherein the expiration parameter is based on profile information associated with the user and the contact.

12. The method of claim 6, wherein the expiration parameter is user specified.

13. The method of claim 6, wherein the interaction comprises sharing of digital content between the user and the contact.

14. A server system, comprising:
one or more processors; and
memory storing one or more programs for execution by the one or more processors, the one or more programs including instructions for:
assigning an expiration parameter to a contact of a user, wherein the expiration parameter indicates when the contact should be disassociated from the user, the assignment of the expiration parameter being based on a frequency of interaction between the user and the contact;
detecting an interaction between the user and the contact; and
modifying the expiration parameter for the contact based on the one or more detected interaction.

* * * * *